United States Patent [19]

Kamiya

[11] Patent Number: 5,122,951
[45] Date of Patent: Jun. 16, 1992

[54] SUBJECT AND WORD ASSOCIATING DEVICES

[75] Inventor: Shin Kamiya, Nara, Japan

[73] Assignee: Sharp Kabushiki Kaisha, Osaka, Japan

[21] Appl. No.: 550,909

[22] Filed: Jul. 11, 1990

[30] Foreign Application Priority Data

Jul. 14, 1989 [JP] Japan ................................ 1-183163

[51] Int. Cl.⁵ ............................................. G06F 15/38
[52] U.S. Cl. ..................................................... 364/419
[58] Field of Search ........................ 364/419, 900, 200

[56] References Cited

U.S. PATENT DOCUMENTS

| 4,712,174 | 12/1987 | Minkler, II | 364/419 |
| 4,758,977 | 7/1988 | Morimoto et al. | 364/419 |
| 4,777,600 | 10/1988 | Saito et al. | 364/419 |
| 4,882,681 | 11/1989 | Brotz | 364/419 |

FOREIGN PATENT DOCUMENTS

63-56723  3/1988  Japan .
63-56724  3/1988  Japan .

OTHER PUBLICATIONS

"Association-Based Parser for Speech Understanding Systems", Denshi Jouhou Tsuushin Gakkai Ronbunshuu (Collection of Treatises of the Society of Electronic Information and Communication), vol. J71-D, No. 5, pp. 782-789.

"Association-Based Parallel Parser for Speech Understanding Systems", by M. Hori, R. Mizoguchi, and O. Kakusho.

*Primary Examiner*—Dale M. Shaw
*Assistant Examiner*—Xuong M. Chung

[57] ABSTRACT

A subject associating device which includes concept table storage for accommodating a concept table; subject pattern storage for accommodating subject patterns representative of subjects of sentences; a subject pattern generator for converting a sequence of learning phrases or words into a sequence of independent word concepts for generating histograms for the independent word concepts and for storing a pattern of the histograms in the subject pattern storage as a subject pattern; and a subject associating unit for converting the sequence of phrases or words input into the sequence of independent word concepts, for generating the histogram for the independent word concept, for performing a matching between the pattern of independent word concepts of the input sentence and the subject pattern accommodated in the subject pattern storage, and for selecting the subject pattern, which has the small matching distance, as the subject pattern descriptive of the subject of the input sentence.

12 Claims, 4 Drawing Sheets

| Subject 1 | | | Subject 2 | | Subject 3 | |
|---|---|---|---|---|---|---|
| Situation 1 | Situation 2 | Situation 3 | Situation 4 | Situation 5 | Situation 6 | Situation 7 |

Time ⟶

| Consecutive No. t | 55 | 56 | 57 | 58 |
|---|---|---|---|---|
| Phrase Sequence B(t) | /FATHER | ATE A BEEF | FROM | AMERICA / |
| Concept No. Seq.S(t) | 65 | 70 | 54 | 131 |

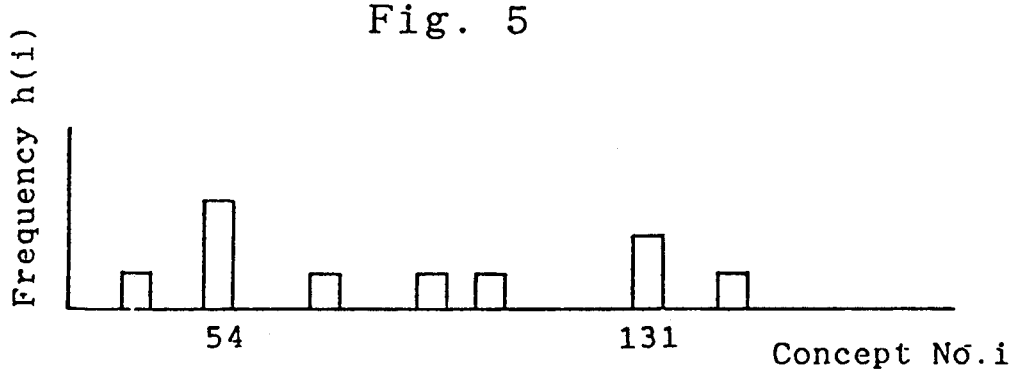
Fig. 5
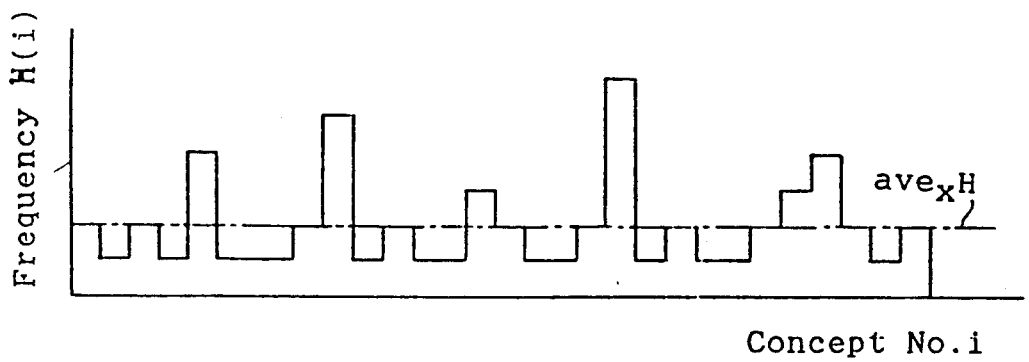
Fig. 6
Fig. 7
| Consecutive No. t | 171 | 172 | 173 | 174 |
|---|---|---|---|---|
| Phrase Sequence B(t) | /GOVERNMENT | IMPORTED | SUGAR FROM | ENGLAND/ |
| Concept No. Seq. S(t) | 71 | 70 | 145 | 54 65 |

SUBJECT AND WORD ASSOCIATING DEVICES

BACKGROUND OF THE INVENTION

1. Field of the Invention

The present invention relates to a subject associating device for associating the subject of a sentence inputted and a word association device for associating the subject of the inputted sentence to associate a word appropriate to the associated subject.

2. Description of the Prior Art

It is expected that in the future, an automatic telephone translation system will be capable of translating speech from the calling party into another language before the call is received by the receiving party. The automatic telephone translation system, achieves an acceptable level of recognition performance by associating a subject on the basis of voice speech and a recognition vocabulary of about 3,000 words used in the context of the associated subject.

On the other hand, as discussed above, the following method has been suggested in an article "Association-Based Parser for Speech Understanding Sytems", Denshi Jouhou Tsuushin Gakkai Ronbunshuu (Collection of Treatises of the Society of Electronic Information and Communication), Vol. J71-D No. 5, pp. 782-789, as a method of associating a subject from imput speech. According to this association-based parser, a recognition is made of a speech of a statement descriptive of a scene expressed with the use of a vocabulary of about 1,000 words, spoken phrase to phrase, and association of a subject is made with the use of a semantic and contextural restriction which may be a subject and situation network, so that out of plural recognized phrase candidates a proper phrase candidate can be selected by selecting a word appropriate to the associated subject.

However, the following problems occur when the semantic and contextural restriction analogous to the above discussed subject and situation network is to be configured Namely, as shown in FIG. 2, a subject shifts slowly as compared with a situation. However, there is no objective difference between the subject and the situation and the definition of the subject and the situation varies from person to person. By way of example, if the following paragraph is presented to six panelists (Associators A, B, C, D, E and F), each of them will associate the following subject and situation.

Sentence for Association (Paragraph)

"In England, the weather is very unstable. We are often surprised with an abnormal weather. It often occurs that sometime snow falls in January, sometime snow falls in March, yet sometime snow falls in June. February is not always the month during which snow falls. Of course, no body will be surprised to have a snowfall in February. February is the month of the year during which the snowfall occurs quite naturally."

Associator A                                                 Time →

| Subject   | Weather in England | Snowfall            |                      |                    |
|-----------|--------------------|--------------------|----------------------|--------------------|
| Situation | Weather            | Abnormal Snowfall  | Snowfall in February | Natural Snowfall   |

Associator B

| Subject   | Weather | Snowfall |
|-----------|---------|----------|
| Situation | England | England  |

Associator C

| Subject   | Weather |         | Time of Snowfall |      |          |
|-----------|---------|---------|------------------|------|----------|
| Situation | England | January | March            | June | February |

Associator D

| Subject   | Weather in England | Weather in February |
|-----------|--------------------|---------------------|
| Situation | Unstable Weather   | Snowfall            |

Associator E

| Subject   | Winter in England |
|-----------|-------------------|
| Situation | Abnormal Weather  |

Associator F

| Subject   | Weather  |
|-----------|----------|
| Situation | Snowfall |

As discussed above, from one panelist to another there is a broad difference in subject and situation. The number of the subjects varies from 1 to 2, and the number of the situations varies from one to five. Accordingly, when realizing the automatic telephone translation system, a number of people do their own configuring of semantic and contextural restrictions, analogous to the above mentioned subject and situation network, the quality of the subject and situation network would vary as a result of the broad difference from one person to another and, therefore, no stable association would occur.

SUMMARY OF THE INVENTION

Accordingly, the present invention is intended to provide a subject associating device capable of stably associating the subject of an inputted sentence with the use of semantic and contextural restrictions configured automatically according to a predetermined rule and also to provide a word associating device capable of associating a word on the basis of the associated subject obtained by associating the subject of the inputted sentence with the use of the subject associating device.

To this end, the subject associating device of the present invention comprises a concept table storage for accommodating a concept table in which independent words and independent word concepts, descriptive of the respective independent words, are associated with each other; a subject pattern storage for accommodating subject patterns representative of subjects of sentences; a subject pattern generator for converting a sequence of learning phrases or words inputted into a sequence of independent word concepts by making reference to the concept table accommodated in the concept table storage, for generating a histogram for each independent word concept within a predetermined section wherein each independent word concept in the resultant sequence of the independent word concepts is taken as a reference, and for storing a pattern of the histograms so generated in the subject pattern storage as a subject pattern; and a subject associating unit for converting a sequence of phrases or words inputted into a sequence of independent word concepts by making reference to the concept table accommodated in the concept table storage, for generating a histogram for the independent word concept within a predetermined section wherein each independent word concept in the resultant sequence of the independent word concepts is taken as a reference, for performing a matching between a pattern of independent word concepts of the inputted sentence and the subject pattern accommodated in the subject pattern storage and for selecting the subject pattern, which has a small matching distance, as a subject pattern descriptive of the subject of the inputted sentence.

Preferably, the subject pattern generator of the subject associating device is so structured that a plurality of independent word concepts can be generated on the basis of a plurality of sequences of learning phrases or words and the group of the resultant histograms of the independent word concepts are subsequently clustered so that a pattern of the histogram of the independent word concepts representative of each cluster can be stored in the subject pattern storage as the subject pattern.

The present invention also provides a word associating device which comprises the subject associating device as described hereinbefore, and a word associating unit for selecting one of the independent words belonging to the independent word concepts whose frequency of occurrence in the subject pattern selected by the associating unit of the above described subject associating device is high, in the event that there is a plurality of phrase candidates or word candidates for the phrases or words constituting the phrase sequence or word sequence of the inputted sentence, and also to output a sequence of phrases or words utilizing the phrase or word candidate comprised of independent words appropriate to the selected subject of the inputted sentence.

According to the present invention, with the subject associating device, when the leaning phrase or word sequences are inputted to the subject pattern generator, reference is made to the concept table in which the independent words and the independent word concepts, descriptive of respective concepts of the independent words, are coordinated and the learning phrase or word sequences are converted into the sequence of independent word concepts. The histogram of the independent word concepts within the predetermined section wherein each independent word concept in the resultant sequence of the independent word concepts is taken as a reference is then generated, and the pattern of the histograms of the independent word concepts, so generated, subsequently stored in the subject pattern storage as the subject pattern descriptive of the subject of the sentence.

Thereafter, when the sentence is inputted to the subject associating unit, the above described concept table is referred to, so that a sequence of phrases or words of the inputted sentence can be converted into a sequence of independent word concepts. The histogram of the independent word concepts within the predetermined section wherein each independent concept word in the sequence of the independent word concepts of the inputted sentence is generated, and a matching is then performed between a pattern of the histogram so generated of the independent word concept of the inputted sentence and the subject pattern stored in the subject pattern storage, so that the subject pattern having a small matching distance can be selected as the subject pattern representative of the subject of the inputted sentence, thereby causing the subject of the inputted sentence to be associated.

Also, if the subject pattern generator of the above described subject associating device is so designed as to generate a plurality of histograms of the independent word concepts on the basis of a plurality of the learning phrase or word sequences, and the resultant group of the histograms are subsequently clustered so that the pattern of the histogram of the independent word concepts representing each cluster can be stored in the subject pattern storage as the subject pattern, the subject patterns can be prepared for the various subjects.

With the word associating device of the present invention in which the above described subject associating device is incorporated, where there is a plurality of candidates for the phrases or words constituting the phrase or word sequence of the inputted sentence and when those phrase or word candidates are inputted to the word associating unit, one of the independent words constituting the plural phrase or word candidates, which belongs to the independent word concepts whose frequency of occurrence is high in the subject pattern selected by the subject associating unit of the subject associating device, is selected so that the independent word appropriate to the inputted sentence can be associated. Accordingly, the phrase or word candidates comprising the independent words appropriate to the inputted sentence associated by the subject associating unit can be selected to enable the proper phrase or word sequence to be outputted.

BRIEF DESCRIPTION OF THE DRAWINGS

This and other objects and features of the present invention will become clear from the following description taken in conjunction with a preferred embodiment thereof with reference to the accompanying drawings, in which:

FIG. 5 is a diagram showing an example of histograms h obtained from a phrase sequence associated with the dietary habits;

FIG. 6 is a diagram showing an example of an average histogram of the histograms h obtained from all learning phrase sequences;

FIG. 7 is a diagram showing an example of the sequence of concept numbers obtained from both of a phrase lattice for evaluation and a phrase lattice thereof.

DETAILED DESCRIPTION OF THE EMBODIMENT

Figures 1, 2, 3:
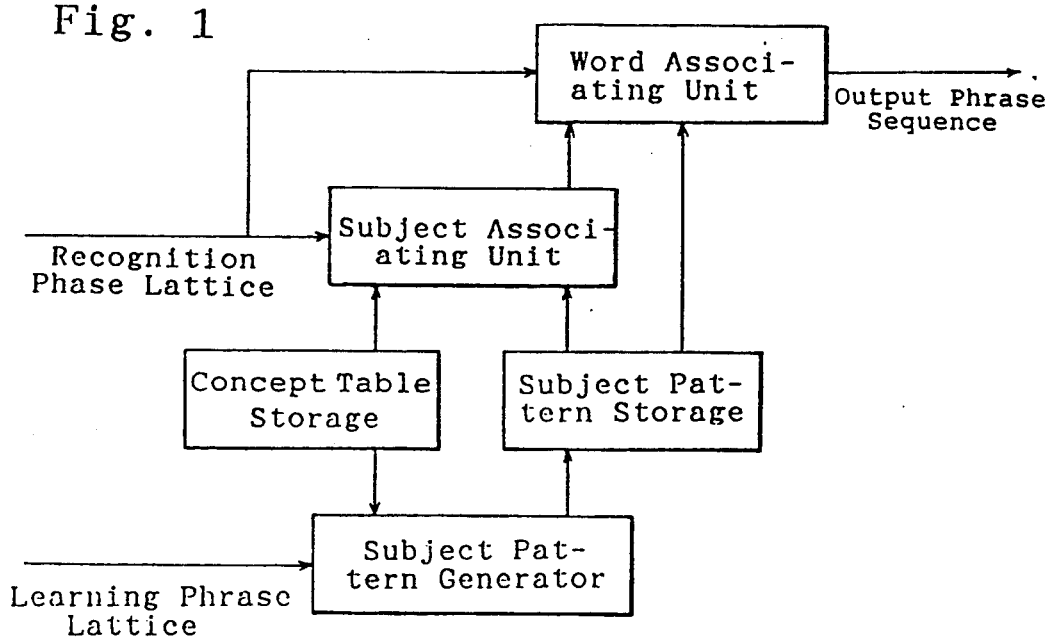
FIG. 1 is a block diagram showing a word associating device according to preferred embodiment of the present invention.
FIG. 2 is a diagram showing a shift of subjects and situations in a sentence.
FIG. 3 is a diagram showing an example of the sequence of concept numbers determined from both of a learning phrase sequence and a phrase sequence thereof.

FIG. 1 illustrates a block diagram showing a word associating device according to the present invention. The word associating device therein is designed so that, where a plurality of phrase candidates are obtained by means of a recognition process, or a conversion process during a speech recognition or a Kana-Kanji character conversion (Kana being a Japanese phonetic character and Kanji being a Japanese ideographic character), respectively, a proper phrase sequence can be outputted by associating a subject of an input sentence with independent words appropriate to the associated subject and by selecting a proper one of the independent words constituting the plural phrase candidates. Hereinafter, the association of the subject and the association of the independent words, of which are both applicable to speech recognition, will be discussed.

After input speech to be recognized has been subjected to an analog-to-digital (A/D) conversion by a speech recognizing unit, characteristic parameters such as power, analytic values of linear predication, etc. are extracted therefrom. a pnoneme lattice or a syllable lattice is then determined from the characteristic parameters, and a lattice of phrase candidates is outputted from the phoneme lattice, or the syllable lattice according to grammar rules of the phrases. In this way, the lattice of the phrase candidates (the recognized phrase lattice) outputted from the speech recognizing unit is input to a subject associating unit 1 and a word associating unit 2. It is to be noted that, in FIG. 1, the speech recognizing unit is not illustrated.

The subject associating unit 1 referred to above constitutes an important part of the present invention. As will be described in detail, the subject associating unit 1 operates to perform a matching between a pattern of independent word concept histograms of the recognized phrase lattice obtained by referring to a concept table stored in a concept table storage 4, and a pattern of subjects stored in a subject pattern storage 5 and then to select a pattern of subjects analogous to the recognized phrase lattice inputted from the speech recognizing unit, that is, to associate a subject of the recognized phrase lattice.

On the other hand, the subject pattern stored in the subject pattern storage 5 is generated in the following manner. Namely, a learning speech is input to the speech recognizing unit and, in a manner similar to that to be recognized, a syllable sequence (a sequence of learning phrases) is output which is subsequently input to a subject pattern generator 3. Then, by the operation of the subject pattern generator 3, independent word concept histograms of the learing phrase sequence are generated by referring to the concept table stored in the concept table storage 4. A representative histogram of all of the histograms so generated is determined and is stored in the subject pattern storage 5.

Hereinafter, the generation of the subject pattern executed by the subject pattern generator 3, the association of the subject executed by the subject associating unit 1 and the association of independent words executed by the word associating unit 2 will be discussed in detail.

(A) Subject Pattern Learning (Generating ) Mode

Table 1 illustrates a table of ladders of concepts which provide the basis for the concept table stored in the concept table storage 4 in the illustrated embodiment of the present invention.

TABLE 1

| Part of Speech | Major Class | Medium Class | Concept Number | Minor Class | Independent Words |
|---|---|---|---|---|---|
| Noun | Abstract Relation | Events | 1 | Demonstrative Pronoun | |
| | Time & Space | Time | 15 | Time | |
| | | Space | 21 | Scope | |
| | | | 22 | Place | Top, Side Front |
| | Measures | Absolute Measures | 25 | Number | One, Three |
| | | Relative Measures | 27 | Size | Width, Length |
| | Attributes | Part & Whole | 31 | Part | |
| | Material | Raw Material | 46 | Chemical Composition | |
| | | | 47 | Minerals | Iron, Gold |
| | | Products | 52 | Goods | |
| | | | 53 | Clothing | Suits, Socks |
| | | | 54 | Foods | Candies, Sugar, Beef |
| | | Manufacturing Facilities | 60 | Tools | Drill, Nipper |
| | | | 61 | Utensils | Dishes, Cups |
| | Subject of Activity | Living Things | 65 | Human Being | Father, Sato, |
| | | | 66 | Animals | Dog, Bird, Cicada |
| | | | 67 | Plants | Rose, Grass, Dead tree |
| | | Organization | 70 | Public & Private | America, City |
| | | | 71 | Society | World, Company, School |
| Verb | Abstract Relation | Motion | 105 | Passage | Leave, Go |
| | | | 106 | Separation & Gathering | Scatter, Pile |
| | Time & Space | Time | 120 | Time | |

TABLE 1-continued

| Part of Speech | Major Class | Medium Class | Concept Number | Minor Class | Independent Words |
|---|---|---|---|---|---|
| | Measures | Absolute Measures | 126 | Number | |
| | Human Relation | Sense & Feeling | 130 | Sensation | To be excited |
| | | Life & Culture | 131 | Life Style | To get up, To eat |
| Adjective | Abstract Relation | — | — | — | — |
| | Time & Space | — | — | — | — |

The concept ladder table listed in Table 1 may be prepared by experts on the basis of target vocabularies, and concept numbers indicative of respective concepts of independent words are added to the minor class. In accordance with the concept ladder table so prepared, the concept table in which the concept numbers representative of the independent words are coordinated with the independent words, is stored in the concept table storage 4. Although the total number of the concept numbers employed therein is about 200, it may be finely divided into about 1,000 depending on a particular application. Using the concept table so stored in the concept table storage 4, a pattern of subjects can be generated by the subject pattern generator 3 in the following manner.

Let it be assumed that serial consecutive numbers of the phrases contained in the learning phrase sequence supplied from the speech recognizing unit (not shown) are expressed by t, that the t-th phrase is expressed by B(t), and that the concept number of each independent word in the concept table of the independent words constituting the phrase B(t) is expressed by S(t).

Hereinafter, using as an example of the learning phrase sequence a sentence "/父は/アメリカからの/牛肉を/食べた/" (Transliterally, "/Father/from America/a beef/ate/", meaning "Father ate a beef from America.") is inputted to the subject pattern generator 3. The manner in which the subject pattern is generated will now be described.

In the first place, in the subject pattern generator 3, reference is made to the concept table stored in the concept table storage 4 to examine the concept number S(t) of each independent word constituting the learning phrase sequence, "/父は/アメリカからの/牛肉を/食べた/", followed by a conversion of the learning phrase sequence into a sequence of concept numbers S(t). In other words, the concept number i of the independent word, "父 (Father)" constituting the 55th phrase B(55) of the learning phrase sequence shown in FIG. 3 is determined as suggested by i=S(55)=65 from Table 1. The concept numbers S(t) of the other phrases B(t) can be determined in a similar manner, and therefore, it will readily be seen that such a sequence of concept numbers as shown in FIG. 3 can be obtained.

Figure 4A:
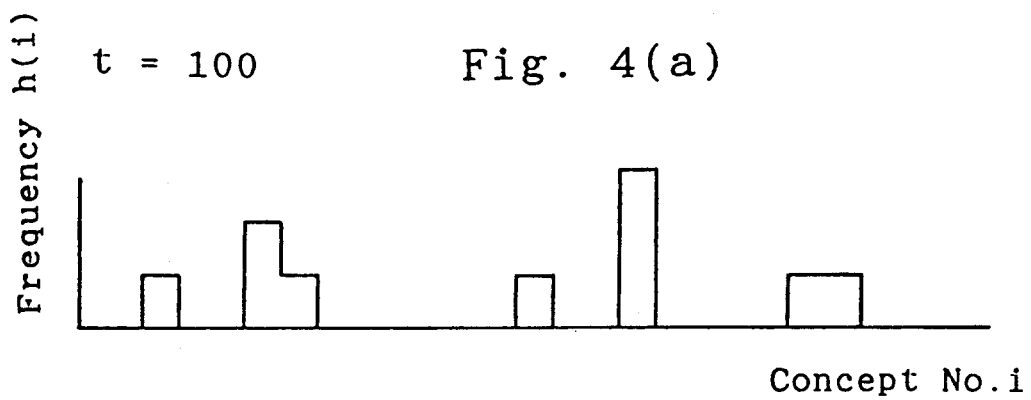
FIG. 4 comprising of FIGS. 4a-4d, are diagrams showing examples of histograms at certain numbers during the generation of the histograms h for the concept numbers of the learning phrase sequence, respectively.
Figure 4B:
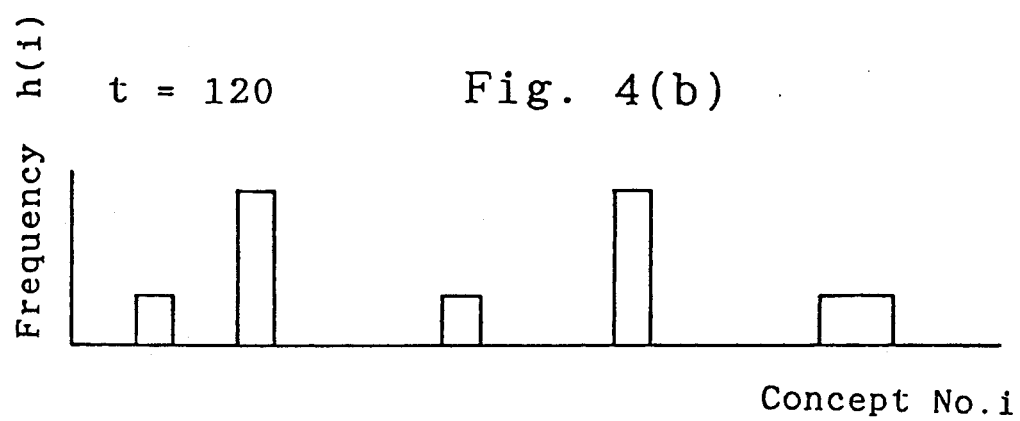
Figure 4C:
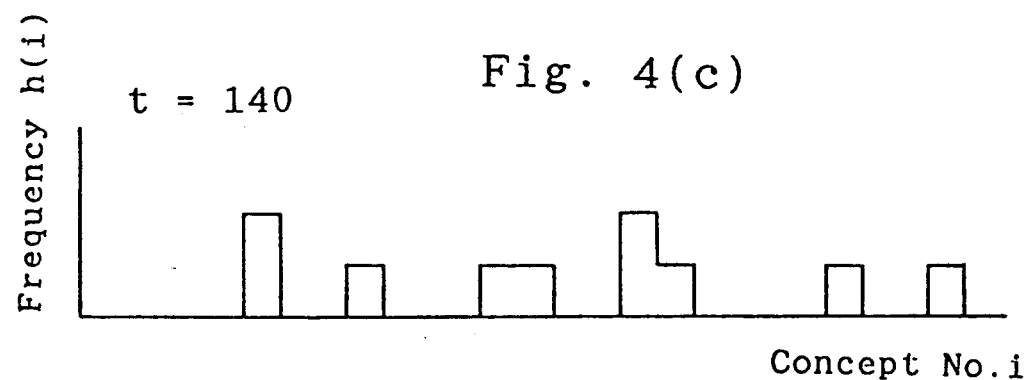
Figure 4D:
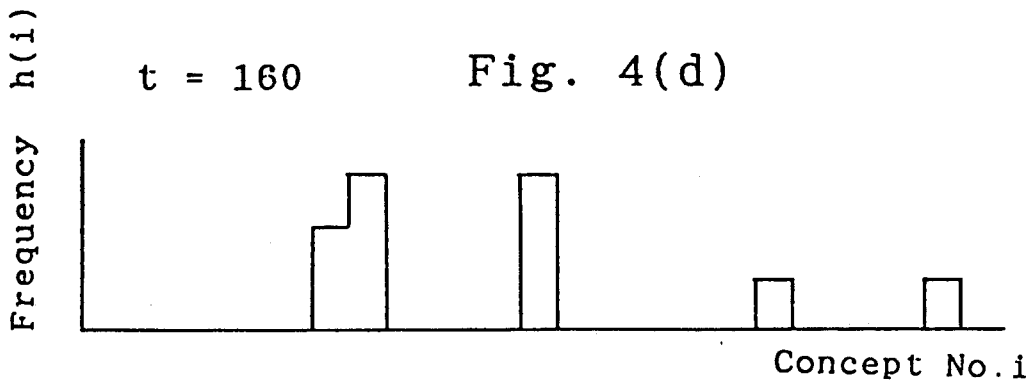

Thereafter, with respect to all the concept numbers S(t) in the concept number sequence constituting the learning phrase sequence, the frequency of occurrence of the concept numbers S(t-1) to S(t-T) of the (t-1)-th to (t-T) th phrases is determined to give a histogram which is hereinafter referred to by histogram ht (or histogram h for short). The frequency of occurrence of the concept number i in the histogram h so obtained is expressed by h(i). FIG. 4 (a) illustrates a histogram obtained when, during the determination of the histogram h of, for example, a certain learning phrase sequence, T is 10 and t is 100; FIG. 4(b) illustrates a histogram obtained when T is 10 and t is 120; FIG. 4(c) illustrates a histogram obtained when T is 10 and t is 140; and FIG. 4(d) illustrates a histogram obtained whe T is 10 and t is 160.

It is to be noted that T referred to above corresponds to the length of the phrase sequence which has been already recognized and which is utilized when the subject of the input sentence or a word is to be associated. Accordingly, when the value of T is set to be about 20, the resultant histogram h will illustrate the frequency of occurrence of each concept number in the concept number sequence corresponding to a "situation". On the other hand, when T is set to 50 or a greater value, the resultant histogram will illustrate the frequency of occurrence of each concept number in the concept number sequence corresponding to a "subject" which shifts more slowly than the "situation". An example of the histogram h obtained when a sentence related with the dietary habits is illustrated in FIG. 5. From FIG. 5, it will readily be seen that the frequency of occurrence of the concept number illustrative of the independent words related with the dietary habits (that is, the concept number i=54 descriptive of the minor class "Foods" and the concept number i=131 descriptive of the minor class "Life Style") is high with the histogram h shown to represent the pattern of subjects.

In this way, a plurality of learning phrase sequences inputted to the subject pattern generator 3 are converted into histograms h. Assuming that the maximum value of the concept number i in the histogram h is I, the pattern of the histogram h can be regarded as a vector of I-order. The subject pattern generator 3 performs a clustering of all of the histograms (vectors) obtained to determine a plurality of clusters. Any suitable clustering method can be employed in the practice of the present invention. With the histogram (for example, a center histogram) representative of each cluster so determined being taken as a subject pattern, the latter is stored in the subject pattern storage 5. In other words, this subject pattern constitutes semantic and contextual restrictions used during the association of the subject. The subject pattern stored in this subject pattern storage 5 is given a subject pattern number k, the maximum value of which is expressed by K.

Also, the average of the histograms h obtained from all of the learning phrase sequences is expressed by H and the average value of the frequencies of occurrence in the average histogram H is expressed by aveH. One example of this average histogram H is shown in FIG. 6.

Thus, the semantic and contextual restrictions formulated in the illustrated embodiment of the present invention are automatically configured by the subject pattern generator 3 according to a predetermined rule and, therefore, they can be formulated according to predetermined standards even when various learning phrase sequences are inputted. Accordingly, the association of the subject taking place with the use of the semantic and contextual restrictions can be executed stably.

(B) Evaluation of Recognition Phrase Lattice Mode (Subject/Word Association Mode)

The recognition phrase lattice determined by the speech recognizing unit (not shown) on the basis of the input speech to be recognized is input to the subject associating unit 1 and the word associating unit 2. Using an example in which the recognition phrase lattice, "/政府が/イギリスから/輸入した/さとうを/" (Transliterally, "Government/from England/ imported/sugar/", meaning "the sugar the government imported from England"), is input to the subject associating unit 1 and the word associating unit 2, the process of evaluating of the recognition phrase lattice will now be discussed in detail. In this case, there exists two phrase candidates, "/砂糖を/" (Note: Both Japanese are a homophone, the former meaning a sugar and the latter the name of a particular person.) for the phrase "/さとうを/" used in the above illustrated recognition phrase lattice, and one of the phrase candidates which is appropriate to the input speech is selected by the processes of the subject association and the word association.

At the outset, the subject of the recognition phrase lattice is associated. In other words, in the subject associating unit 1, reference is made to the concept table stored in the concept table storage 4 to examine the concept number S(t) of each independent word constituting the recognition phrase lattice.
so that the recognition phrase sequence can be converted into the concept number S(t) sequence. In other words, the concept number i of the independent word, "政府(government)", constituting the 171st phrase B(171)="政府" of the recognition phrase lattice shown in FIG. 7 is determined as i=S(171)=71 in reference to Table1. As far as the 171st phrase "さとうを" is concerned, the concept number candidate S(174)=54 corresponding to the phrase candidate, "砂糖を", and the concept number candidate S(174)=65 corresponding to the phrase candidate. "佐藤を", can be obtained. Based on the resultant concept number sequence, and in a manner similar to that during the learning mode of the subject pattern, the frequency of occurrence of each concept number S(t) within a section T encompassing all of the concept numbers S(t) up to t=173 (that is, the consecutive number of a phrase preceding the 174th phrase) is determined so that a histogram h can be subsequently generated.

Figure 8:
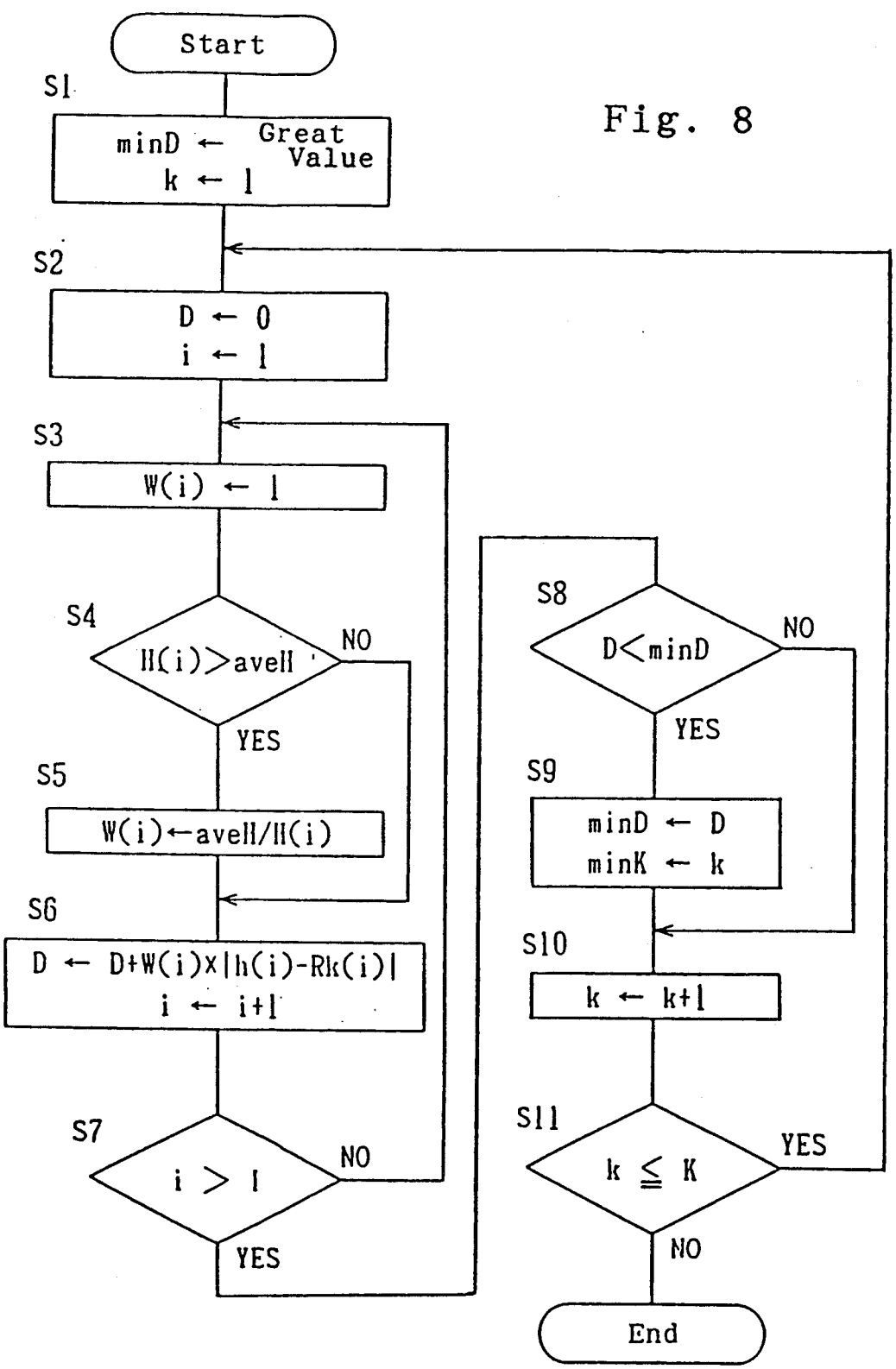
FIG. 8 is a flowchart showing an example of a distance calculating operation.

The subject associating unit 1 then operates to perform a pattern matching between a pattern of histograms h of the concept number S(t) constituting the recognition phrase lattice determined in the manner described above (hereinafter referred to as a recognition pattern) and a pattern of all of the subjects (the number of which is K) stored in the subject pattern storage 5 and then selects m subject patterns in the order a minimum distance of matching. In other words, the selection is made of the pattern of the m subjects having the histogram pattern of the independent words similar to the histograms of the independent words constituting the input sentence. FIG. 8 illustrates the flowchart showing the process of distance calculation executed when m=1. Reference will now be made to FIG. 8 to show how the distance is calculated.

Referring now to FIG. 8, and at step S1, an initial value greater than that expected is set to a minimum value minD of the distance D and "1" is set to the subject pattern number k.

At step S2, an initial value "0" is set to the distance D and the concept number i is set to "1". Then at step S3, "1" is set to a weight W(i) used during the distance calculation.

At step S4, a decision is made to determine if the frequency of occurrence H(i) of the concept number i in the average histogram H is greater than the average value aveH. If the result of decision at step S4 indicates that the frequency of occurrence H(i) is greater than the average value aveH, the program proceeds to step S5, or otherwise it skips step S5. At step S5, the weight W(i) is set to the average value aveH.

In other words, where the frequency of occurrence H(i) is greater than the average value aveH, it means that the concept number i occurs in a high frequency and, therefore, the weight W(i) is set to a value smaller than "1" appropriate to the ratio between the frequency of occurrence H(i) and the average value aveH. On the other hand, if the frequency of occurrence H(i) is smaller than the average value aveH, the weight W(i) is set to "1".

At step S6, the distance D is replaced with $(D+W(i)\times |h(1)-Rk(i)|)$ and "1" is added to the concept number i. Then at step S7, a decision is made to determine if the concept number i is greater than a maximum value I thereof. Should the result of decision indicate that the concept number i is greater than the maximum number I, the program proceeds to step S8, otherwise it returns to step S3 to perform a process subject to the concept number i+I.

In other words, the sum of the difference between the frequency of occurrence of the subject pattern for each concept number and the recognition pattern and all of the concept numbers is calculated to be a distance D.

At step S8, a decision is made to determine if the value of the distance D is smaller than the minimum value minD. If the result of decision indicates that the distance D is smaller than the minimum value minD, the program proceeds to step S9, otherwise it skips step S9.

At step S9, the minimum value minD of the distance D is substituted by the value of the distance D calculated at step S6, and the subject pattern number minK at which the distance D attains the minimum value is substituted by k. Then, at step S10, "1" is added to the subject pattern number k.

At step S11, a decision is made to determine if the value of the subject pattern number k is smaller than the maximum value K. If the result of decision indicates that the subject pattern number k is smaller than the maximum value K, the program returns to step S2 to perform a process subject to the next succeeding subject pattern, otherwise it terminates the distance calculation.

The foregoing flowchart is applicable where m is 1. If the value m is 2 or greater, use should be made of, for example, a m number of the minimum value minK so that the value of the distance D can be obtained in a m number counted from the smallest value. Also, the unit of measure may be a Euclid unit of distance or any other unit of distance.

An assumption is made that the subject of the input sentence is contained in the m-th subject pattern counted from the smallest value of the distance D, that is, the subject of the inputted sentence is associated.

Once the subject has been associated by the subject associating unit 1 in the manner as hereinabove described, the word associating unit 2 operates on the basis of information furnished by the subject associating unit 1 to associate a independent word appropriate to the subject, associated by the subject associating unit 1, from the independent words constituting the phase candidates of the recognition phrase lattice, and then to select the proper phase candidates on the basis of the result of such association. Hereinafter, the association of the independent word and the selection of the phrase candidates executed by the word associating unit 2 will be discussed.

The subject pattern number minK of the m subject patterns in the order from the minimum value of the distance D selected by the subject associating unit 1 is outputted to the word associating unit 2. Once this occurs, the word associating unit 2 reads the subject pattern specified by the subject pattern number minK out from the subject pattern storage 5. Then the m subject patterns read out are averaged to provide the average subject pattern Hm and the pattern of the subject of the inputted sentence is expressed by this average subject pattern Hm. In other words, the frequency of occurrence of the concept number i in the average subject pattern Hm descriptive of the pattern of the subject of the input sentence will be Hm(i) and, therefore, it may be possibly said that the independent word of the concept number i which shows a high value of the frequency of occurrence Hm(i) might be an independent word exactly expressing the subject of the input sentence.

The word associating unit 2 selects one of the phrase candidates which has a high reliability, in the following manner, since the phrase candidate of high reliability can be regarded as appropriate to the subject of the recognized sentence (that is, the independent word constituting the phrase candidate of high reliability has a high frequency of occurrence Hm(i) in the average subject pattern Hm). Namely, the frequency of occurrence Hm(54) in the average subject pattern Hm of the concept number candidate S(174)=54 corresponding to the phrase candidate, "♥ ■ を" used in the following example, of the 174th phrase of the recognition phrase lattice, "/政府が"イ ギ リ ス か ら /輸 入 した 砂糖を/" is determined. The frequency of occurrence Hm(65) in the average subject pattern Hm of the concept number candidate S(174)=65 corresponding to the phrase candidate, "去 ■ を", is also determined. Then, the value of the frequency of occurrence Hm(54) and the value of the frequency of occurrence Hm(65) are compared with each other so that the concept number candidate exhibiting a higher value can be regarded as having a high reliability. In this example, the word associating unit 2 selects the concept number i=54 of the frequency of occurrence Hm(54) having a higher value. In other words, an independent word appropriate to the subject of the inputted sentence comprised of phrases having respective consecutive numbers t=(174-T) to 173, "砂 糖 " is associated. Then, the phrase candidate "砂 糖 を" corresponding to the independent word "砂 糖 " is preferentially selected as representing the result of association and, as a consequence of the recognition, the phrase sequence "政府がイギリスから輸入した砂糖を" is outputted.

In this way, the word associating device according to the illustrated embodiment is operable in such a manner that, during a subject pattern learning mode, the subject pattern generator 3 refers to the concept table stored in the concept table storage 4 to convert the learning phrase sequence into the sequence of the concept numbers representative of the respective concepts of the independent words. Then, the pattern of the histograms h of the concept numbers contained in a predetermined number of phrases relative to each concept number in the concept number sequence constituting the learning phrase sequence is generated. The plural histograms h so generates are clustered to provide the subject pattern descriptive of the subject of the sentence.

On the other hand, during the recognition phrase lattice evaluating mode, and when the recognition phrase lattice is inputted to the subject associating unit 1, reference is made to the concept table for the conversion of the recognition phrase lattice into the sequence of the concept numbers so that a pattern of the histograms of the concept number sequence so obtained can be generated. Then, the pattern matching is performed between the pattern of the concept number histograms of the recognition phrase lattice and the subject pattern stored in the subject pattern storage 5 to determine the subject pattern having a small distance D thereby to enable the subject of the input sentence to be associated. Then, the word associating unit 2 operates to allocate the concept number candidate constituting each phrase candidate to the subject pattern descriptive of the subject of the input sentence, to select the independent word of the concept number candidate occurring in a high frequency and then to associate the independent word appropriate to the subject of the inputted sentence. The phrase candidate comprised of the independent word so associated is selected as the proper phrase candidate, followed by the outputting of the phrase sequence using the selected proper phrase candidate.

Thus, according to the foregoing illustrated embodiment, since the semantic and contextual restrictions (that is, the subject pattern) can be automatically formulated using the concept table of target vocabularies, prepared by grammar experts, and the learning phrase sequence inputted, the subject of the inputted sentence can be stably associated with the use of the semantic and contextual restrictions. The independent word appropriate to the subject associated in the manner described above is associated and the phrase candidates constituted by the associated independent words are selected as the proper phrase candidates. Accordingly, even the user having no knowledge on the grammar can obtain the proper phrase candidates easily.

In the foregoing embodiment, discussion has been made of the word associating device which is advantageously utilized for selecting, during the speech recognition, the phrase candidates occurring in a high frequency, from the plural phrase candidates outputted from the speech recognizing unit. However, the present invention may not be always limited thereto, and may be used for selecting, during the Kana-Kanji conversion, conversion candidates of high reliability from a plurality of conversion candidates outputted from a converter.

While in the foregoing illustrated embodiment the subject of the inputted sentence associated by the subject associating unit 1 is used for the association of the independent words, the present invention may not be always limited thereto.

Also, in the foregoing illustrated embodiment, it has been described that the subject pattern is prepared on the basis of the histograms of the independent words constituting the phrase sequence and the inputted Japanese sentence is processed in units of phrase. However, the present invention may not be always limited thereto and may be designed that, for example, the subject pattern can be prepared on the basis of histograms of independent words constituting the word sequence so that an English sentence inputted can be processed in units of word.

An algorithm for calculating the distance between the pattern of the concept number histograms of the recognition phrase lattice and the subject pattern may not be always limited to that employed in the foregoing illustrated embodiment of the present invention.

From the foregoing description, it is clear that the subject associating device of the present invention comprises the concept table storage for accommodating the concept table in which independent words and independent word concepts descriptive of the respective independent words are coordinated with each other; the subject pattern storage for accommodating subject patterns representative of subjects of sentences; the subject pattern generator for converting the sequence of learning phrases or words inputted into the sequence of independent word concepts by making reference to the concept table accommodated in the concept table storage, for generating the histogram for the independent word concept within the predetermined section wherein each independent word concept in the resultant sequence of the independent word concepts is taken as the reference, and for storing the pattern of the histograms so generated in the subject pattern storage as the subject pattern; and the subject associating unit. The subject associating unit makes reference to the concept table stored in the concept table storage for converting the sequence of phrases or words inputted into the sequence of independent word concepts, for generating the histogram for the independent word concept within the predetermined section wherein each independent word concept in the resultant sequence of the independent word concepts is taken as the reference, for performing the matching between the pattern of independent word concepts of the inputted sentence and the subject pattern accommodated in the subject pattern storage and for selecting the subject pattern, which has the small matching distance, as the subject pattern descriptive of the subject of the inputted sentence. Therefore, the subject of the inputted sentence can be stably associated with the use of the semantic and contextural restrictions which are automatically configured according to the predetermined rule.

Also, since the subject pattern generator of the subject associating device is structured so that the plurality of independent word concepts can be generated on the basis of the plurality of sequences of learning phrases or words and the group of the resultant histograms of the independent word concepts are subsequently clustered so that the pattern of the histogram of the independent word concepts representative of each cluster can be stored in the subject pattern storage as the subject pattern, it is possible to store in the subject pattern storage, a number of subject patterns having various subjects, making it possible to accomplish a highly reliable association.

In addition, the word associating device according to the present invention comprises the subject associating device of the construction described hereinbefore, and the word associating unit is designed so as to select one of the independent words belonging to the independent word concepts whose frequency of occurrence in the subject pattern selected by the associating unit of the above described subject associating device is high, in the event that there is the plurality of phrase candidates or word candidates for the phrases or words constituting the phrase sequence or word sequence of the inputted sentence, and also to output the sequence of phrases or words utilizing the phrase or word candidate comprised of independent words appropriate to the selected subject of the inputted sentence. Therefore, not only can the subject of the inputted sentence be associated with the semantic and contextural restrictions automatically configured according to the predetermined rule, but also the proper phrase or word to follow can be selected on the basis of the associated subject. This makes it possible that the phrase or word sequence appropriate to the subject of the inputted sentence can be outputted by means of a simple process by storing the concept table in the concept table storage.

In other words, the process of generating the subject pattern according to the present invention may be said to be a model of the process in which children use their perception to acquire a knowledge of events occurring in the world and acquire a power of association with increase of the knowledge.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A subject associating device which comprises:

concept table storage means for storing a concept table in which a plurality of independent words and one or more independent word concepts descriptive of each of the plurality of independent words are associated;

subject pattern storage means for storing a plurality of subject patterns representative of a plurality of sentence subjects;

Subject pattern generating means for converting a learning character string into a plurality of independent word concepts by utilizing the concept table stored in said concept table storage means, for generating a plurality of histograms, each corresponding to one of the plurality of independent word concepts for generating a subject pattern from the plurality of histograms, and for storing the subject pattern in said subject pattern storage means; and subject associating means for converting an input character string into a plurality of independent input word concepts by utilizing the concept table stored in said concept table storage means, for generating a plurality of input histograms, each corresponding to one of the plurality of independent input word concepts for generating an input subject pattern from the plurality of input histograms, for calculating a matching distance from the input subject pattern to each of the plurality of subject patterns stored in said subject pattern storage means, for selecting one of the plurality of subject patterns with a smallest matching distance, as a matched subject pattern, and for outputting the matched subject pattern.

2. The subject associating device of claim 1, wherein said subject pattern generating means converts a plurality of learning character strings and wherein the plurality of histograms are clustered prior to generating the subject pattern.

3. The subject associating device of claim 1 or claim 2, further comprising:
  word associating means for selecting each of the plurality of independent words corresponding to one or more independent word concepts whose frequency of occurrence in the matched subject pattern, output from said subject associating means, is high, when there is a plurality of independent word concepts for each of the the plurality of selected independent words and for outputting an output character string in response to a character string candidate including independent words representative of a selected subject of the input character string.

4. The subject associating device of claim 2, wherein said plurality of learning character strings are time sequenced.

5. A subject associating device which comprises:
  concept table storage means for storing a plurality of independent words and one or more independent word concepts corresponding to each of the plurality of independent words such that each of the plurality of independent words and its corresponding independent word concepts have a similar meaning;
  subject pattern storage means for storing a plurality of subject patterns, each of which corresponds to one of a plurality of learning character string subjects;
  subject pattern generating means for converting a learning character string into a pattern of independent word concepts utilizing the plurality of independent words and their corresponding independent word concepts of said concept table storage means, for generating a plurality of character string histograms from the learning character string by counting the number of occurrences of each of the pattern of independent word concepts, and for storing the plurality of character string histograms as a subject pattern which represents a learning character string subject in said subject pattern storage means; and
  subject associating means for converting an input character string into a input pattern of independent word concepts, utilizing the plurality of independent words and their corresponding independent word concepts of said concept table storage means, for generating a plurality of input histograms, each corresponding to one of the input pattern of independent word concepts, for generating an input subject pattern from the input pattern of independent word concepts, for calculating a matching distance from the input subject pattern to each of the plurality of subject patterns stored in said subject pattern for selecting one of the plurality of subject patterns with the smallest matching distance, and for outputting the selected one of the plurality of subject patterns with the smallest of said matching distances.

6. The subject associating device of claim 5, wherein said subject pattern generating means converts a plurality of learning character strings and wherein the plurality of string histograms for each of the plurality of learning character strings are clustered, prior to generating a plurality of subject patterns.

7. The subject associating device of claim 5 or 6 further comprising:
  word associating means for converting the input character string into a plurality of words wherein each word has a plurality of candidates, for selecting one of the plurality of candidates, for each of the plurality of words of the input character string, which corresponds to an independent word concept which occurs frequently in the selected one of said plurality of subject patterns, for associating each of the plurality of words of the input character string, and for outputting each of the plurality of associated words of the input character string.

8. The subject associating device of claim 6, wherein said plurality of learning character strings are time sequenced.

9. A method for generating a subject pattern for an input character string comprising the steps of:
  a) storing a plurality of independent words and one or more independent word concepts which corresponds to each of the plurality of independent words;
  b) storing a plurality of subject patterns, each of which corresponds to one of a plurality of learning character string subjects;
  c) converting a learning character string into a pattern of independent word concepts utilizing the plurality of independent words and their corresponding independent word concepts in concept table storage;
  d) generating a plurality of character string histograms by counting the number of occurrences of each in the pattern of independent word concepts;
  e) storing the plurality of character string histograms as a subject pattern which represents a learning character string subject in subject pattern storage;
  f) converting the input character string into an input pattern of independent word concepts, utilizing the plurality of independent words and their corresponding independent word concepts in the concept table storage;
  g) generating a plurality of input histograms, each corresponding to one of the input pattern of independent word concepts:
  h) generating an input subject pattern from the input pattern of independent word concepts;
  i) calculating a matching distance from the input subject pattern to each of the plurality of subject patterns;
  j) selecting one of the plurality of subject patterns stored in said subject pattern storing means, with a smallest matching distance;
  k) outputting the one of the plurality of subject patterns with the smallest matching distance.

10. The method of claim 9 wherein step c) converts a plurality of learning character strings and wherein step d) the plurality of character string histograms for each of the plurality of learning character strings are clustered, prior to generating a plurality of subject patterns.

11. The method of claim 9 or 10 further comprising the steps of:
   i) converting the input character string into a plurality of words wherein each word has a plurality of candidates;
   j) selecting one of the plurality of candidates, for each of the plurality of words of the input characters string, which is associated with one of the independent word concepts which occurs frequently in the subject pattern;
   k) associating each of the plurality of words of the input character string; and
   l) outputting each of the plurality of associated words of the input character string.

12. The subject associating device of claim 10, wherein said plurality of learning character strings are time sequenced.

* * * * *